(12) United States Patent
Liao et al.

(10) Patent No.: US 7,385,594 B2
(45) Date of Patent: Jun. 10, 2008

(54) POSITION ENCODED SENSING DEVICE AND A METHOD THEREOF

(75) Inventors: Chen-Hsien Liao, Taipei (TW); Hsu-Ping Tseng, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 191 days.

(21) Appl. No.: 10/780,702

(22) Filed: Feb. 19, 2004

(65) Prior Publication Data

US 2005/0184964 A1    Aug. 25, 2005

(51) Int. Cl.
*G09G 5/00* (2006.01)

(52) U.S. Cl. .................. 345/173; 345/174; 345/175; 345/178; 345/179

(58) Field of Classification Search ............. 345/175, 345/178, 174, 55, 74, 76, 80, 104, 179–183, 345/102; 455/12.1; 342/386, 385; 340/995; 382/186; 341/5; 347/3; 361/93.1

See application file for complete search history.

(56) References Cited

U.S. PATENT DOCUMENTS

| | | | | |
|---|---|---|---|---|
| 3,658,402 A | * | 4/1972 | Nishida et al. ............. 341/5 |
| 3,716,804 A | * | 2/1973 | Groschwitz ................ 385/14 |
| 5,504,482 A | * | 4/1996 | Schreder ............... 340/995.13 |
| 5,771,039 A | * | 6/1998 | Ditzik ...................... 345/178 |
| 5,966,108 A | * | 10/1999 | Ditzik ...................... 345/75.2 |
| 5,966,112 A | * | 10/1999 | Katagiri et al. ............. 345/104 |
| 6,137,482 A | | 10/2000 | Kim .......................... 345/179 |
| 6,191,828 B1 | | 2/2001 | Kim et al. .................... 349/12 |
| 6,388,729 B2 | | 5/2002 | Ahn et al. .................... 349/190 |
| 6,441,362 B1 | | 8/2002 | Ogawa ....................... 250/221 |
| 6,483,498 B1 | | 11/2002 | Colgan et al. ............... 345/173 |
| 6,690,344 B1 | * | 2/2004 | Takeuchi et al. ............. 345/85 |
| 6,717,565 B1 | * | 4/2004 | Kurosawa et al. ........... 345/102 |
| 6,720,920 B2 | * | 4/2004 | Breed et al. ................. 342/386 |
| 6,825,987 B2 | * | 11/2004 | Repetto et al. ............... 359/633 |
| 6,951,375 B2 | * | 10/2005 | Patton et al. ................... 347/3 |
| 2003/0203717 A1 | * | 10/2003 | Chuprun et al. ............ 455/12.1 |
| 2004/0047505 A1 | * | 3/2004 | Ghassabian ................ 382/186 |
| 2004/0140964 A1 | * | 7/2004 | Wang et al. ................. 345/179 |
| 2004/0145844 A1 | * | 7/2004 | Franke et al. ............... 361/93.1 |
| 2005/0162400 A1 | * | 7/2005 | Tseng et al. ................ 345/173 |
| 2005/0162401 A1 | * | 7/2005 | Tseng et al. ................ 345/173 |

FOREIGN PATENT DOCUMENTS

JP    2000-172437    6/2000

* cited by examiner

*Primary Examiner*—Prabodh Dharia
(74) *Attorney, Agent, or Firm*—Arent Fox LLP

(57) ABSTRACT

A position encoded sensing device having a display panel, a light guiding layer disposed on the display panel. The light guiding layer is configured to have encoded information therein. In addition, the position encoded sensing device includes a transceiver for detecting light and the encoded information that are guided out of the light guiding layer.

21 Claims, 9 Drawing Sheets

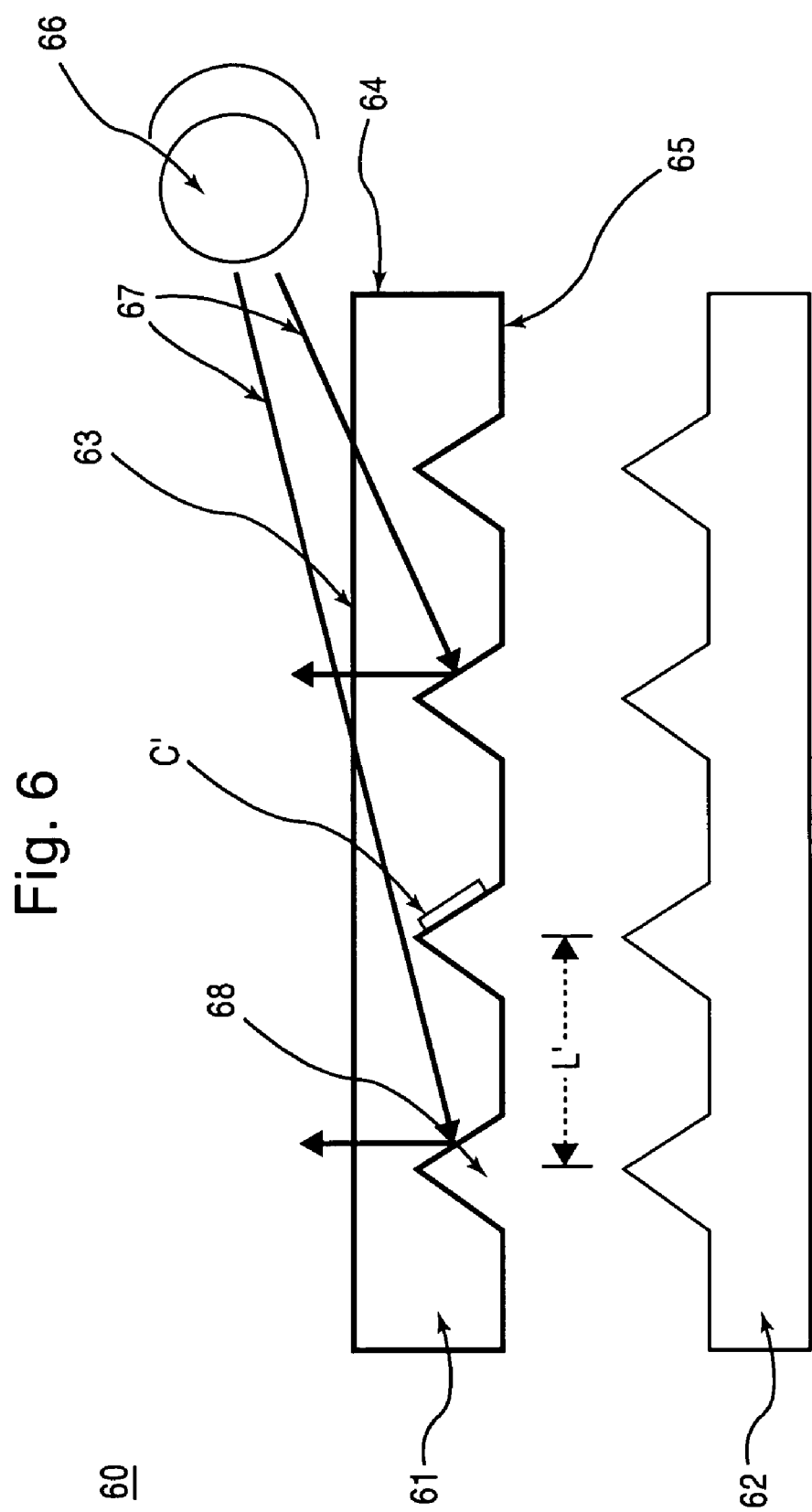

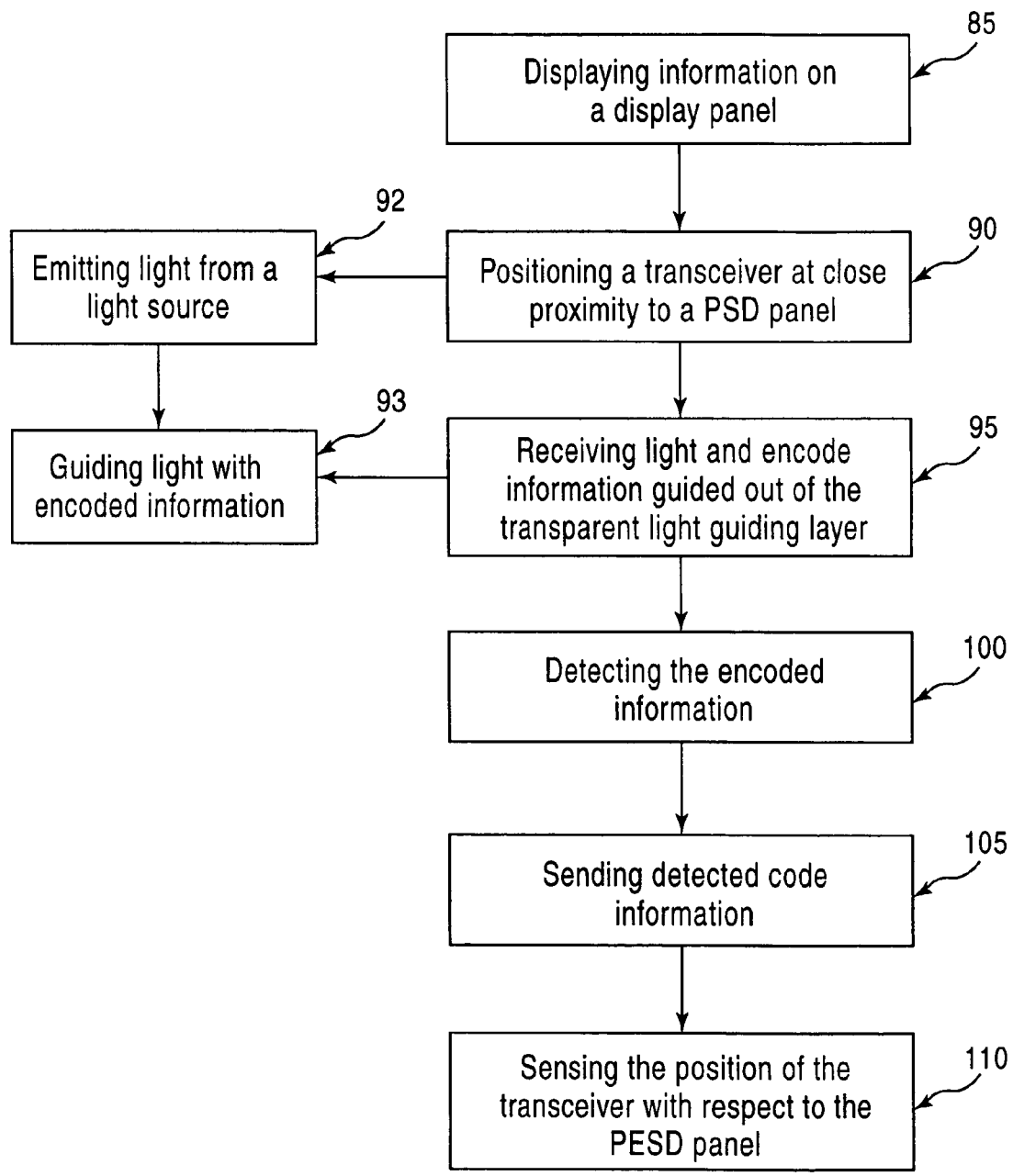

POSITION ENCODED SENSING DEVICE AND A METHOD THEREOF

BACKGROUND OF THE INVENTION

1. Field of the Invention

The present invention relates to a position encoded sensing device (PESD) and a method of sensing a position with respect to a display device. In particular, the present invention relates to a liquid crystal display sensing device having a position encoded light guide plate, together with a transceiver for emitting light to the light guide plate and receiving light reflected from the light guide plate, such that the present invention senses or determines the precise position of the transceiver with respect to the display, based on the encoded information disposed within the light guide plate.

2. Related Art

Flat panel displays have become very popular in the electronic industry. Flat panel displays are generally provided in electronic products such as notebook computers, desktop monitors, televisions, digital cameras, DVD players, PDAs, mobile phones, portable games, and car navigation systems, among other applications. Some flat panel displays are position sensible liquid crystal display (PSLCD) devices whereby the PSLCD can sense the position of a stylus only when the stylus is in a direct contact with the display panel.

For instance, FIG. 1 shows an LCD with an electromagnetic digitizer. FIG. 1 illustrates a flat panel display 10 having a cover and protective glass layer 11, an LCD layer 12, and an electromagnetic digitizer layer 13. The electromagnetic digitizer layer 13 contains a sensor board 15 made up wires in a grid format. The electromagnetic digitizer layer 13 is disposed at the bottom layer of the flat screen display 10. The flat screen display 10 of FIG. 1 is pressure sensitive such that the stylus 14 must be in a direct contact with the display 10. Pressure must be applied onto and detected by the sensor board of the electromagnetic digitizer layer 13 of the display 10 in order for the display 10 to sense the position of the stylus. The display 10 as shown in FIG. 2 is a complicated structure since the sensor board 15 contains a complicated grid of wires.

FIG. 2 shows another example of a PSLCD 20 having an integrated resistive touch sensor disposed therewith. The PSLCD 20 includes an LCD 21 and a polarizing filter 22. Moreover, the PSLCD 20 includes a flexible conductive layer 23 disposed on the polarizing filter 22. A stylus 24 is provided to make direct physical contact with the flexible conductive layer 23 of the PSLCD 20. In order for the PSLCD 20 to sense the position of the stylus 24, the flexible conductive layer 23 must sense the resistive touch applied by the stylus 24 on the display. Since the flexible conductive layer 23 is disposed on the polarizing filter 22 of the PSLCD 20 of FIG. 2, a substantial amount of processing is made on the polarizing filter 23. As such, the transparency of the display is significantly decreased.

In addition, FIG. 3 shows another example of a PSLCD device 30 which includes a LCD 31 and a stylus 32. In addition, the PSLCD device 30 includes a plurality of detecting units 33 disposed on two corners of the LCD 31. The PSLCD device 30 of FIG. 3 is a pressure sensitive device such that the stylus 32 must make physical contact with the LCD 31 in order for the PSLCD device 30 to function. Specifically, pressure must be applied to the LCD 31 from the stylus, and the detecting units 33 must detect the stylus and the applied pressure in order for the PSLCD device 30 to function properly. Given the configuration as shown in FIG. 3, the PSLCD device 30 contains numerous disadvantages. For example, the PSLCD device 30 requires a plurality of detecting units 33 mounted on the corners of the LCD 31 which causes the device to be ergonomically awkward and cumbersome. Moreover, the detecting units 33 increase the weight of the device. Also, the functional accuracy of the PSCLD device 30 is easily diminished by extraneous light and particles that comes into contact with the PSLCD device 30, and in particular in contact with the detecting units 33.

In view of the aforementioned PSLCD devices with their disadvantages, there is a need to have a flat screen display device that can employ a liquid crystal display sensing device having a position encoded light guide plate (LGP), together with a transceiver so that the display device can have a simplified module structure without requiring additional control circuitries. Moreover, there is also a need as well as market demand for a position encoded liquid crystal display sensing device that can be thinner in size and lighter in weight.

SUMMARY OF THE INVENTION

One example of the present invention provides a position encoded sensing device having a display panel, a light guiding layer disposed on the display panel. The light guiding layer is configured to have encoded information therein. In addition, the position encoded sensing device includes a transceiver for detecting light and the encoded information that are guided out of the light guiding layer.

In another example, the present invention is directed to a method of sensing a position on a display. The method includes the steps of displaying information on a display panel, positioning a transceiver proximately to the display panel, and emitting light from at least one light source of a light guiding layer. In addition, the method includes the steps of guiding the light with encoded information out of light guiding layer, detecting the light and the encoded information guided out of the light guiding layer at the transceiver, and processing the encoded information detected by the transceiver.

In yet another example, the present invention provides a system for sensing a position on a display having a display means for displaying information on a display panel, a positioning means for positioning a transceiver proximately to the display panel, and an emitting means for emitting light from at least one light source of a light guiding layer. Furthermore, the system includes a light guiding means for guiding the light with encoded information out of light guiding layer, a detecting means for detecting the light and the encoded information guided out of the light guiding layer at the transceiver, and a processing means for processing the encoded information detected by the transceiver.

DESCRIPTION OF THE DRAWINGS

The accompanying drawings, which are included to provide a further understanding of the present invention and are incorporated in and constitute a part of this specification, illustrate examples of the present invention and together with the description serve to explain the principles of the present invention.

In the drawings:

FIG. 6 illustrates a sectional view of a transparent light guide plate in accordance with another example of the present invention;

FIG. 8 illustrates one example of the method in which to implement the present invention.

DETAILED DESCRIPTION OF THE EXEMPLARY EMBODIMENTS

Reference will now be made in detail to the exemplary embodiments of the present invention, examples of which are illustrated in the accompanying drawings.

The present invention relates to a flat panel display device that can employ an encoded light guide plate disposed on a liquid crystal display, together with a light emitting and light receiving transceiver such as a stylus.

Figure 1:
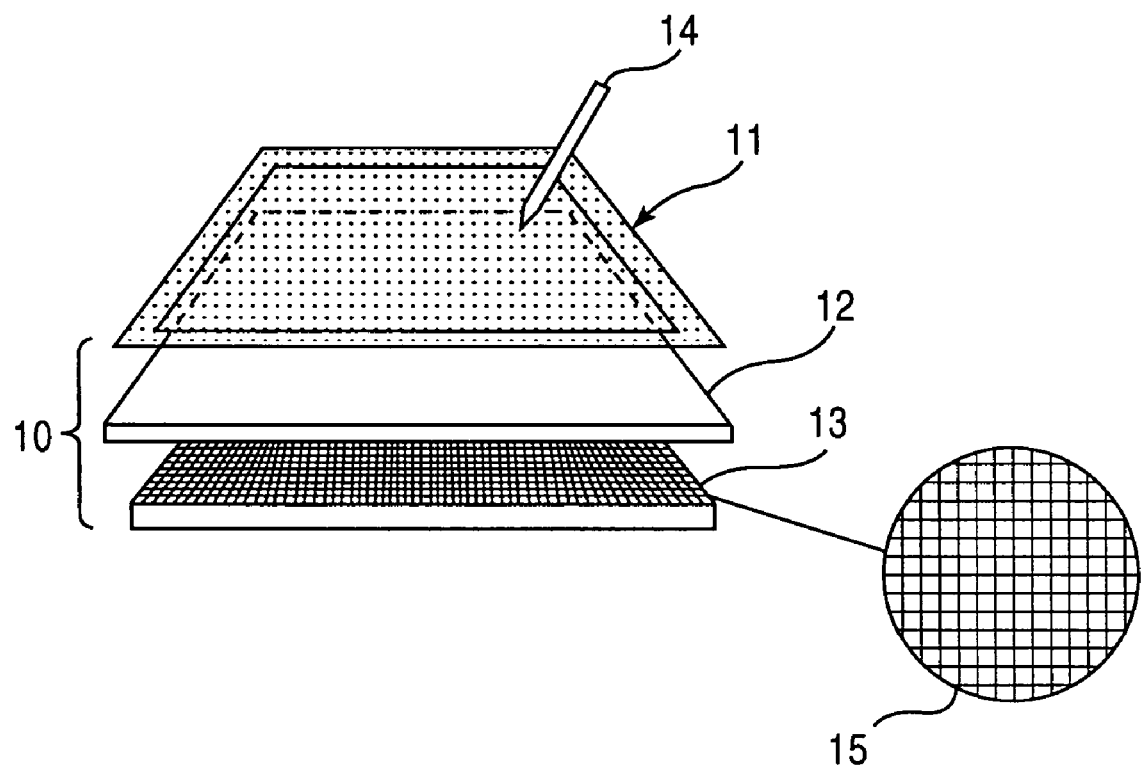
FIG. 1 illustrates one configuration of a resistive touch position sensing liquid crystal display.
Figure 2:
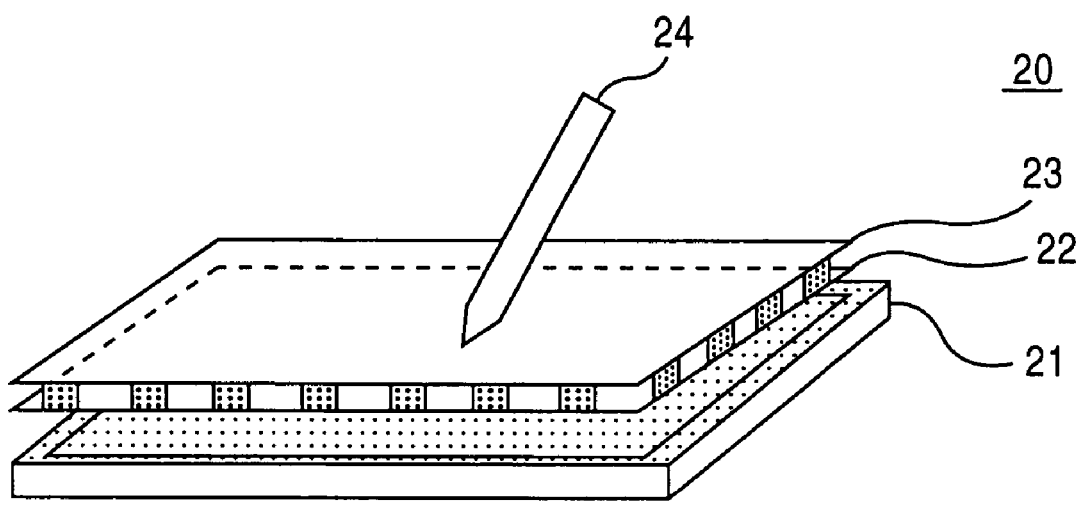
FIG. 2 illustrates another configuration of a resistive touch position sensing liquid crystal display.
Figure 3:
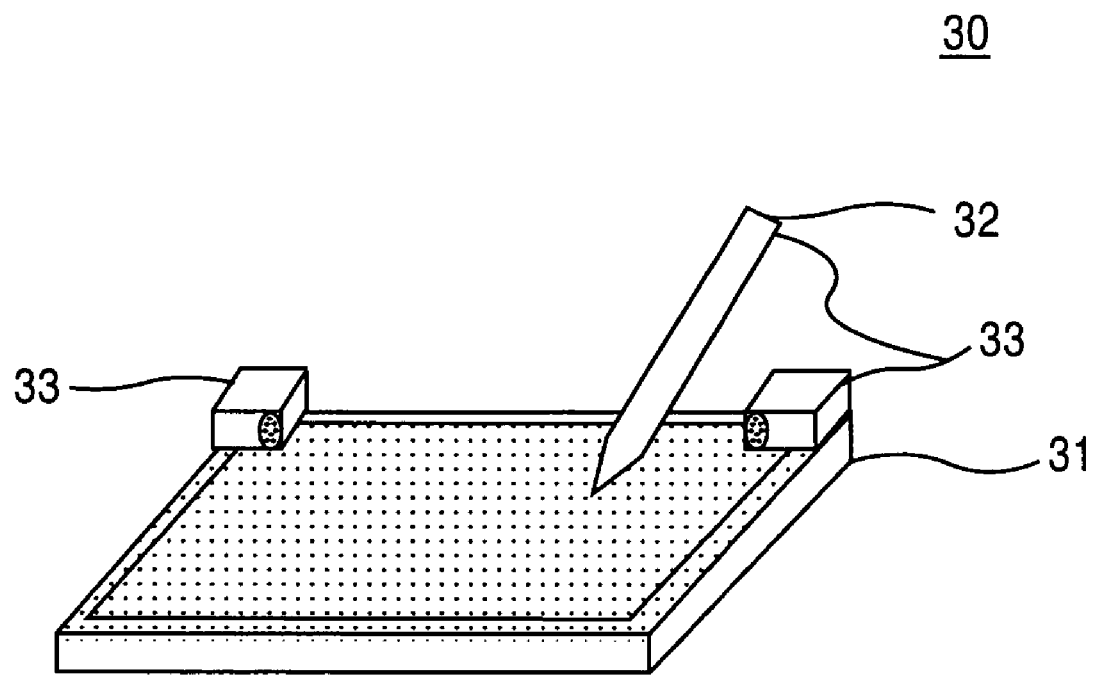
FIG. 3 illustrates another configuration of a resistive touch position sensing liquid crystal display.
Figure 4:
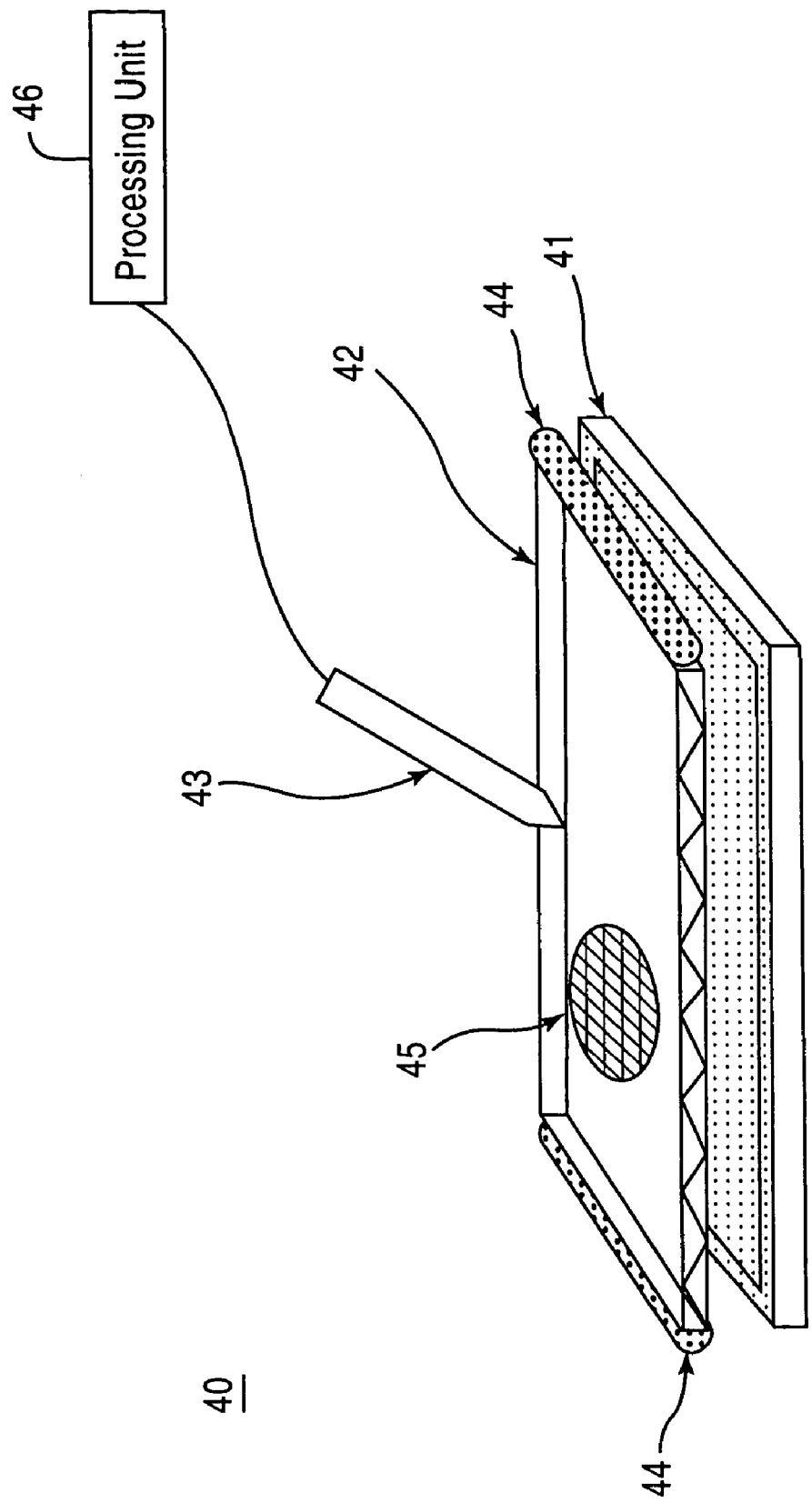
FIG. 4 illustrates one example of a position encoded sensing device in accordance with the present invention.

FIG. 4 illustrates one example of the PESD device 40 of the present invention. In particular, the PESD device 40 includes an LCD panel 41, a display position encoded transparent light guide plate 42, and a transceiver 43. According to the preferred embodiment of the present invention, the transparent light guide plate 42 is disposed on the display surface of the LCD 41.

The transparent light guide plate 42 can be of any shape. For instance, the transparent light guide plate 42 of FIG. 4 can be rectangular, and have the exact dimensions with respect to the length and width, as that of the related LCD 41. The transparent light guide plate 42 has an upper surface, a lower surface and four lateral surfaces. The lower surface of the transparent light guide plate 42 is disposed on the display surface of the LCD 41. In addition, one or more of the four lateral surfaces of the transparent light guide plate 42 are coupled with a light source 44. For example, each of the two opposite lateral surfaces of the transparent light guide plate 44 as shown in FIG. 4 has a light source 44 such as an LED light source connected therewith.

Furthermore, the transparent light guide plate 42 can be constructed from any transparent material, such as glass. In addition, the transparent light guide plate 42 is formed to have programmable information 45 such as display panel position code information embedded therein. The display panel position code information can also be embedded within the transparent light guide plate 42 by a printing process, a mechanical process, and/or other processes such as laser cutting, mechanical cutting, inject molding, and photo etching process to form the code pattern. In addition, the display panel position code information can be embedded with the LCD 51 as a position code pattern.

FIG. 4 also illustrates a transceiver 43 that emits light and receives and/or detects light, such as infrared (IR) light, and/or ultra violet (UV) light. The transceiver 43 is a digital stylus integrated with a transmitter for emitting light waves, a receiver/detector for detecting light waves, and also a light filter such as a visual cut filter for filtering the light. In addition, the transceiver 43 can be connected to a processing unit 46 such that the transceiver 43 sends information to and receives information from the processing unit 46. For instance, the transceiver 43 sends information to and receives information from the processing unit 46 via a wired connection, or a remote connection without wires.

Figure 5A:
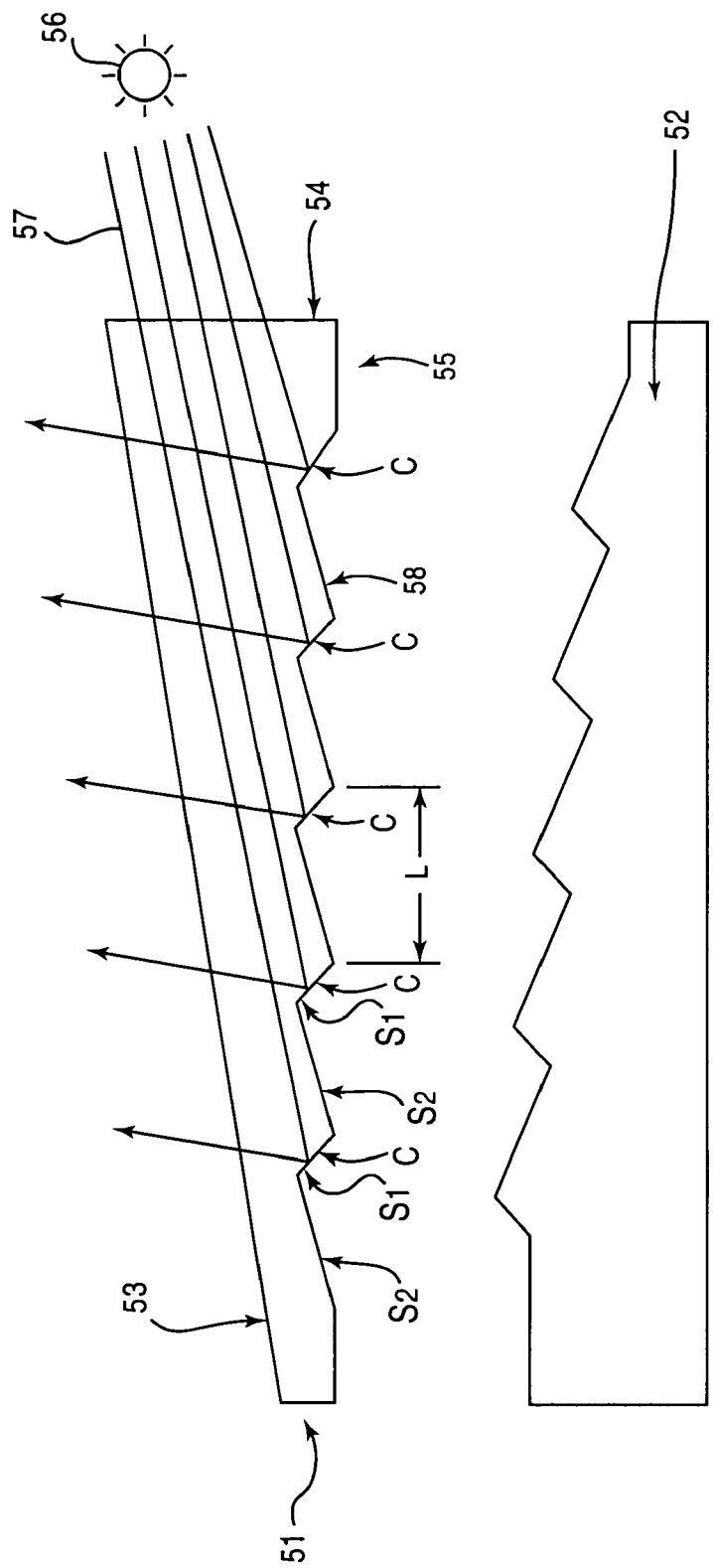
FIGS. 5(a) and 5(b) illustrates a sectional view of a transparent light guide plate in accordance with one example of the present invention.
Figure 5B:
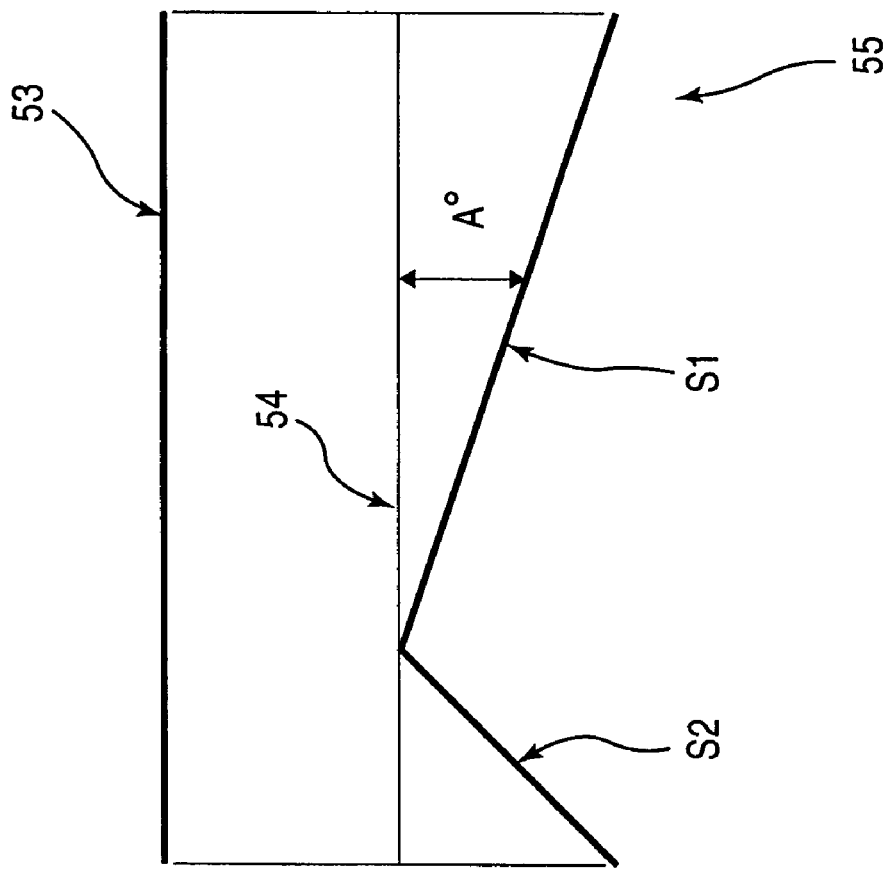

FIGS. 5(a) and 5(b) show a sectional view of a transparent light guide plate 50 in accordance with one example of the present invention.

Specifically, FIG. 5(a) illustrates a sectional view of a transparent light guide plate 50 configured to have an upper section 51 and a lower section 52 such that the upper section 51 and the lower section 52 are configured to be complements to each other. For example, the upper section 51 is formed to fit together with the lower section 52 along their respective surfaces. Both the upper section 51 and the lower section 52 of the transparent light guide plate 50 are fabricated from a transparent material such as glass. In addition, the transparent light guide plate 50 can be embedded with code information C, such as display position code information.

The upper section 51 of FIG. 5(a) has at least an upper face 53, a side face 54 and a lower face 55. The upper face 53 and the side face 54 are flat surfaces, and they are disposed perpendicular to each other. In addition, FIG. 5(a) shows a light source 56 coupled with the transparent light guide plate 50, and is disposed adjacent to the side face 54. The light source 56 can be, for example, a light source comprising light emitting diodes (LED), and emitting light 57 though the side face 54 and into the upper section 51 of the transparent light guide plate 50.

The lower face 55 is configured to have a row of one or more projections 58 as shown in FIG. 5(a). For instance, the lower face 55 is configured to be a serrated edge, a saw-toothed edge, a stepped edge, or the like. Each projection 58 has a point-to-point optimal length "L" that optimally guides the light 57 out of the transparent light guide plate 50 through the direction of the upper face 53. In one example of the present invention, the optimal length "L" of each of the projection 58 is approximately 0.4 mm to 0.6 mm.

In addition, each projection 58 has an optimal angle "A°" (in degrees) with respect to a horizontal surface, such as the upper face 53, which can also optimally guide the light 57 out of the transparent light guide plate 50 through the direction of the upper face 53. FIG. 5(b) shows an expanded and sectional view of a corner edge 59 of a protrusion 58 with respect to the upper section 51 of FIG. 5(a). Specifically, FIG. 5(b) shows the corner edge 59 formed by side surfaces S1 and S2 of the lower face 55. In one example of the present invention, side surface S1 is formed on a left-direction incline such that side surface S1 forms an angle A° of approximately three degrees (3°) or less with respect to a horizontal reference "H", such as the upper face 53. S1 is the reflective surface and each code information C is disposed on the corresponding reflective surface S1.

Accordingly, the lower face 55 as shown in FIG. 5(a) is formed of serrated or saw-toothed edges having an optimal length "L" and an optimal angle "A°" such that the serrated or saw toothed edges optimally guide the light from light source 56 out of the transparent light guide plate 50 through the direction of the upper face 53, and also outputs or guides the encoded information.

Moreover, FIG. 5(a) shows the lower section 52 of the transparent light guide pate 50 having an upper face. The upper face is configured to have a serrated or saw-toothed face that is the complement face of the lower face 55 such that the upper face of the lower section 52 and the lower face 55 of the upper section 51 fit together with the lower section 52 along their respective serrated or saw-toothed surfaces.

FIG. 6 shows a sectional view of a transparent light guide plate 60 in accordance with another example of the present invention. The transparent light guide plate 60 can also be referred to as the V-cut transparent light guide plate.

Specifically, FIG. 6 illustrates a sectional view of a transparent light guide plate 60 configured to have an upper section 61 and a lower section 62 such that the upper section 61 and the lower section 62 are configured to be complements to each other. For example, the upper section 61 is formed to fit together with the lower section 62 along their respective surfaces. Both the upper section 61 and the lower section 62 of the transparent light guide plate 60 are fabricated from a transparent material such as glass. In addition, the transparent light guide plate 60 is embedded with code information C', such as display position code information.

The upper section 61 of FIG. 6 has at least an upper face 63, a side face 64 and a lower face 65. The upper face 63 and the side face 64 have flat surfaces, and they are disposed perpendicular to each other. In addition, FIG. 6 shows a light source 66 coupled with the transparent light guide plate 60, and is disposed adjacent to the side face 64. The light source 66 can be, for example, a light source comprising light emitting diodes (LED), that emits light 67 though the side face 64 and into the transparent light guide plate 60.

The lower face 65 is configured to have a row of one or more inverse V-shaped recesses 68 as shown in FIG. 6. Each inverse V-shaped recess 68 has an apex. According to this example of the present invention, each inverse V-shaped recess 68 is separated by an optimal length "L" from one apex to another apex. In this example of the present invention, the optimal length "L" from one apex to another apex is approximately 0.4 mm to 0.6 mm.

Therefore, the lower face 65 as shown in FIG. 6 is formed with one or more inverse V-shaped recesses 68 having an optimal length "L'" and an optimal angle "A°", such as 45°, so that the one or more inverse V-shaped recesses 68 optimally guide the light from light source 66 out of the transparent light guide plate 60 through the direction of the upper face 63 and also guides the encoded information.

As mentioned above, the transparent light guide plates 50 and 60 of FIGS. 5(a) and 6, respectively, are embedded with code information C, C', such as display position code information. The code information C, C' can be embedded within the transparent light guide plates 50 and 60 by processes such as a printing process, a mechanical process, laser cutting, mechanical cutting, injection molding, photo etching, etc.

Figure 7:
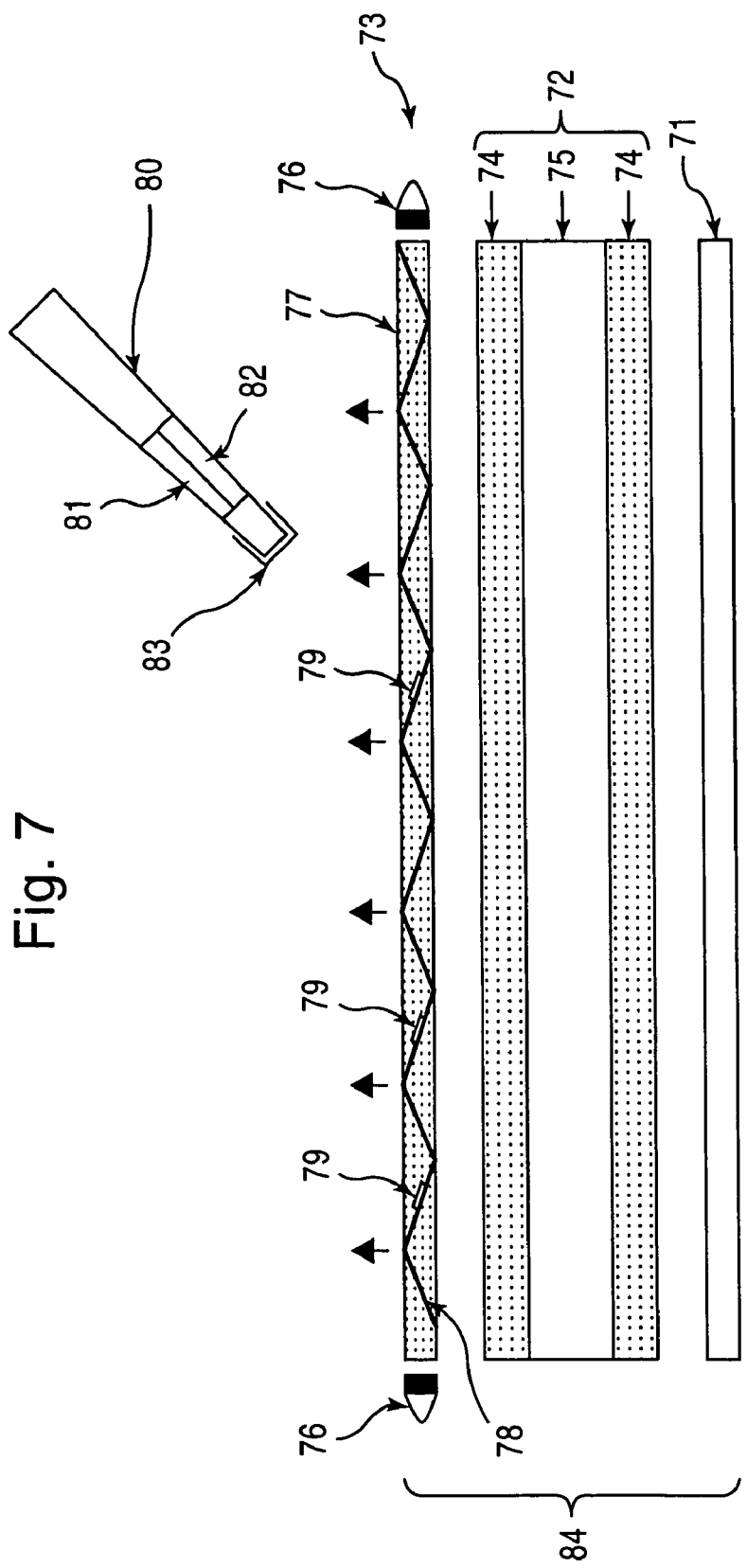
FIG. 7 illustrates a sectional view of a PESD device in accordance with one example of the present invention.

FIG. 7 illustrates a sectional view of a PESD device 70 in accordance with one example of the present invention.

The PESD device 70 has a lower layer 71, a middle layer 72, and a top layer 73. The lower layer 71 of FIG. 7 is a back light unit for emitting back light to the middle layer 72. The middle layer 72 of the PESD device 70 includes two polarizing plates or films 74, and a layer of thin film transistors (TFT) 75. The middle layer 72 together with the lower layer 71 form an LCD display panel. Set on top of the LCD display panel is the top layer 73 which is also referred to as a transparent light guide layer 73. The transparent light guide layer 73 has two LED light sources 76, and a transparent light guide plate 77. Each of the LED light sources 76 is disposed at opposite ends of the transparent light guide plate 77, and emits light into the transparent light guide plate 77 from the sides thereof. The transparent light guide plate 77 is made of a transparent material such as glass and can be configured to include a light guiding face having one or more light guiding surfaces 78. The light guiding face 78 has a row of one or more projections 58 as shown in FIG. 5(a), or a row of one or more inverse V-shaped recesses 68 as shown in FIG. 6. The light guiding face 78 includes display position code information 79 such as C, C' embedded therewith. The top layer 73, which comprises the transparent light guide plate 77 and the LED light sources 76, when combined with the middle layer 72 and the lower layer 71, is considered the position encoded sensing display panel (PESD panel) 84.

In addition, the PESD device of FIG. 7 includes a transceiver 80 that emits light and receives and/or detects light, such as infra red (IR) light, and/or ultra violet (UV) light. The transceiver 80 is a digital stylus integrated with a transmitter 81 for emitting light waves, a receiver/detector 82 for detecting light waves, and also a light filter 83 such as a visual cut filter for filtering the light. The receiver/detector 82 can be, for example, a CMOS image sensor. In addition, the transceiver 80 is connected to a processing unit (shown in FIG. 4) such that the transceiver 43 sends information to and receives information from the processing unit. For instance, the transceiver 80 sends information to and receives information from the processing unit via a wired connection, or a remote connection without wires.

FIG. 8 illustrates one example of the method in which the present invention can function or operate in sensing or detecting the position of a transceiver with respect the PESD device 70.

Step 85 relates to displaying information such as character text, and/or images the PESD panel 84. Once the information is displayed on the PESD panel 84, a user of the PESD device 70 at step 90 positions one end of the transceiver 80 at close proximity to the surface of the transparent light guide layer 73 of the PESD panel 84. Although the transceiver 80 can be in direct physical contact with the top surface of the transparent light guide layer 73 of the PESD panel 84, the PESD device 70 of the present invention can also sense or detect the exact position of the transceiver 80 with respect to the PESD panel 84 when the transceiver 80 is not in direct physical contact with the PESD panel 84. Therefore, the transceiver 80 can be in close proximity to the PESD panel 84 without direct physical contact thereof.

As mentioned above, the PESD panel 84 includes a transparent light guiding layer 73 having LED light sources 76 and a light guiding face with one or more light guiding surfaces 78. At step 92, the LED light sources 76 emit light into the light guiding plate 77 from opposite ends thereof. At step 93, the light guiding face along with one or more light guiding surfaces 78 can guide the light with position display code information which is also referred to as encoded information, out of the transparent light guiding layer 73.

After positioning one end of the transceiver 80 at close proximity to the top surface of the transparent light guide layer 73 of the PESD panel 84, the transceiver 80 at step 95 receives light such as IR light or UV light guided out from the transparent light guiding layer 73 of the PESD panel 84. In particular, the transceiver 80 at step 95 receives light from either the IR LED and/or UV LED light guide sources 76 such that the light received by the transceiver 80 is optimally guided by the light guiding face with one or more light guiding surfaces 78 formed within the PESD panel 84.

As mentioned above, the light guiding face 78 can be embedded with display position code information 79. Therefore, the transmitter 80 at step 95 receives guided IR light along with display position code information 79. In other words, the light from the light sources 76 are guided out of the transparent light guiding plate 77 when the light comes into contact with one or more of the light guiding surfaces 78. As the light is guided out of the transparent light guiding plate 77, the display position code information 79 embedded within the light guiding face with the light guiding surfaces 78 is similarly guided out of the transparent light guiding plate 77.

Thereafter, step 100 detects the light and the display position code information 79 guided out from the transparent light guiding layer 73. For example, the receiver 82 such as a CCD or the like at step 100 can detect the IR light and the display position code information guided out from one or more of the light guiding surfaces 78 of the transparent light guiding layer 73.

Upon receiving the guided light with the display position code information from the light guiding face having one or more of the light guiding surfaces 78, step 105 sends the received and detected display position code information to a processing unit. The processing unit processes the display position code information received and detected from the transceiver 80, and at step 110 the PESD device 70 senses the exact position of the transceiver 80 with respect the PESD panel 70 based on the display position code information encoded within the transparent light guiding layer 73.

It will be apparent those skilled in the art that various modifications and variations can be made in the position encoded liquid crystal display device of the present invention without departing from the spirit or scope of the invention. Thus, it is intended that the present invention cover the modifications and variations of this invention provided they come within the scope of the appended claims and their equivalents.

The invention claimed is:

1. A position encoded sensing device comprising:
   an LCD display panel;
   a light guiding layer disposed on the display panel, wherein the light guiding layer includes:
   a transparent light guiding plate, disposed on a surface of the LCD display panel, wherein the transparent light guide layer has a width and length dimension substantially similar to the LCD display panel;
   at least one light source disposed at one side edge of the light guiding plate; and
   wherein the light guiding plate is configured to have encoded information therein; and
   a transceiver for detecting light and the encoded information that are outputted from the light guiding layer.

2. The device of claim 1, wherein the light guiding layer further comprises:
   a light guiding face disposed within the light guiding plate, wherein the light guiding face is configured to optimally guide the encoded information and light from the at least one light source out of the light guiding plate.

3. The device of claim 2, wherein the light guiding face is configured to include the encoded information.

4. The device of claim 2, wherein the light guiding face includes at least one light guiding surface configured to optimally guide the encoded information and light from the at least one light source out of the light guiding plate.

5. The device of claim 2, wherein the light guiding face includes at least one light guiding serrated surface configured to optimally guide the encoded information and light from the at least one light source out of the light guiding plate.

6. The device of claim 2, wherein the light guiding face includes at least one light guiding inverse-V surface configured to optimally guide the encoded information and light from the at least one light source out of the light guiding plate.

7. The device of claim 1, wherein the encoded information comprises at least one display position code information.

8. The device of claim 1, wherein the transceiver comprises a detector for detecting the light and the encoded information that are outputted from the light guiding layer, and a filter for filtering the light.

9. A method of sensing a position on a display, said method comprising the steps of:
   displaying information on an LCD display panel;
   positioning a transceiver proximately to the display panel;
   emitting light from at least one light source disposed at a side edge of a light guiding layer;
   guiding the light with encoded information out of a transparent light guiding layer, wherein the transparent light guiding layer is disposed on a surface of the LCD display panel;
   detecting the light and the encoded information outputted from the light guiding layer at the transceiver; and
   processing the encoded information detected by the transceiver.

10. The method of claim 9, wherein the step of guiding the light comprises the step of:
    guiding the light with encoded information formed on a light guiding face of the light guiding layer.

11. The method of claim 9, wherein the step of guiding the light comprises the step of:
    guiding the light with display position code information formed on a light guiding face of the light guiding layer.

12. The method of claim 9, wherein the step of processing comprises the step of:
    determining a position of the transceiver with respect to the display panel based on the detected encoded information.

13. A system for sensing a position on a display comprising:
    a display means for displaying information on an LCD display panel;
    a positioning means for positioning a transceiver proximately to the display panel;
    an emitting means for emitting light from at least one light source disposed at a side edge of a transparent light guiding layer; wherein the transparent light guiding layer is disposed on a surface of the LCD display panel;
    a light guiding means for guiding the light with encoded information out of light guiding layer;
    a detecting means for detecting the light and the encoded information guided out of the light guiding layer at the transceiver; and
    a processing means for processing the encoded information detected by the transceiver.

14. The system of claim 13, wherein the light guiding means guides the light with encoded information that are formed on a light guiding face of the light guiding layer.

15. The system of claim 13, wherein the light guiding means guides the light with display position code information formed on a light guiding face of the light guiding layer.

16. The system of claim 13, wherein the processing means comprises: a
    determining means for determining a position of the transceiver with respect to the display panel based on the detected encoded information.

17. The system for sensing a position on a display according to claim 1, wherein the LCD display panel is rectangular.

18. The system for sensing a position on a display according to claim 9, wherein the LCD display panel is rectangular.

19. The system for sensing a position on a display according to claim 18, wherein the transparent light guide layer has a width and length dimension substantially similar to the LCD display panel.

20. The system for sensing a position on a display according to claim 13, wherein the LCD display panel is rectangular.

21. The system for sensing a position on a display according to claim 20, wherein the transparent light guide layer has a width and length dimension substantially similar to the LCD display panel.

* * * * *